United States Patent
Marsh

(10) Patent No.: US 9,265,245 B2
(45) Date of Patent: Feb. 23, 2016

(54) RAPID HEAD MOVEMENT BIRD DECOY

(71) Applicant: Robert E. Marsh, Kansas City, MO (US)

(72) Inventor: Robert E. Marsh, Kansas City, MO (US)

( * ) Notice: Subject to any disclaimer, the term of this patent is extended or adjusted under 35 U.S.C. 154(b) by 66 days.

(21) Appl. No.: 14/163,832

(22) Filed: Jan. 24, 2014

(65) Prior Publication Data
US 2015/0208640 A1    Jul. 30, 2015

(51) Int. Cl.
*A01M 31/06* (2006.01)

(52) U.S. Cl.
CPC .................................... *A01M 31/06* (2013.01)

(58) Field of Classification Search
CPC ...... A01M 31/06; A01M 29/06; A63H 23/10; A63H 13/02; A63H 13/005; A63H 3/16; A47F 8/00; G09B 23/34; G09F 19/08; G09F 2019/085; G09F 2019/086
See application file for complete search history.

(56) References Cited

U.S. PATENT DOCUMENTS

| | | | | |
|---|---|---|---|---|
| 1,562,236 A * | 11/1925 | Holtz | A63H 13/00 211/1.51 |
| 1,616,006 A * | 2/1927 | Sinibaldi | 43/3 |
| 2,307,296 A * | 1/1943 | Peyton | A63H 5/00 40/411 |
| 2,799,960 A * | 7/1957 | Riley | 43/3 |
| 2,835,064 A * | 5/1958 | Webb | 43/3 |
| 2,953,869 A * | 9/1960 | Collischan | 446/191 |
| 3,164,924 A * | 1/1965 | Iwaya et al. | 446/143 |
| 3,199,248 A * | 8/1965 | Suzuki | 446/299 |
| 3,350,808 A * | 11/1967 | Mitchell | 43/3 |
| 3,700,384 A * | 10/1972 | Gardel | A63H 3/18 446/266 |
| 3,916,553 A * | 11/1975 | Lynch et al. | 43/3 |
| 4,356,928 A * | 11/1982 | Stafford | 220/263 |
| 4,845,873 A * | 7/1989 | Hazlett | 43/3 |
| 5,040,319 A * | 8/1991 | Wang | G09F 19/08 40/414 |
| 7,086,193 B1* | 8/2006 | Hurst | 43/2 |
| 7,966,963 B1* | 6/2011 | Caldwell et al. | 116/22 A |
| 2009/0188148 A1* | 7/2009 | Orris et al. | 43/3 |
| 2010/0011650 A1* | 1/2010 | Leonards, Sr. | 43/3 |
| 2014/0259860 A1* | 9/2014 | Baskfield et al. | 43/3 |

* cited by examiner

*Primary Examiner* — Kathleen Alker

(57) ABSTRACT

The present invention is a decoy with a head that rapidly rotates on a vertical axis, creating attention-attracting movement. The powered rotation is both clockwise and counter-clockwise, with an arc of rotation in each direction less than 360 degrees, so that the head does not make full rotations about its axis.

10 Claims, 2 Drawing Sheets

RAPID HEAD MOVEMENT BIRD DECOY

CROSS-REFERENCE TO RELATED APPLICATIONS

This application claims the benefit of U.S. Provisional Patent Application No. 61/759,803, filed Feb. 1, 2013.

STATEMENT REGARDING FEDERALLY SPONSORED RESEARCH OR DEVELOPMENT

Not Applicable.

BACKGROUND OF THE INVENTION

Since live waterfowl decoys were outlawed more than 75 years ago, inventors have worked to replicate the appearance of live birds with inanimate decoys. Efforts to create decoy movement have been the subject of many patents. Early efforts resulted in relatively ineffective decoy movements, like the slow head rotation of the decoy device described in U.S. Pat. No. 2,185,013 (Bonetti, 1939). In the following decades various decoys were developed with heads that could be manually rotated, or that wobbled or swiveled in response to wind movement. None of these approaches applied a powered rotation actuator to cause deliberate, energized and controlled rotation of a decoy head. Other decoy efforts have focused on ever increasing uses of energy to create vigorous movement to the decoys (such as decoys with spinning wings) or vigorous agitation of the water around the decoys. Unfortunately these vigorous motion approaches require significant electrical power and often create a level of noise and artificial movement that is unnatural and unpleasant in the natural waterfowl hunting setting. A rapid full rotation device is not desirable in a head movement application since full (360 degree) rotation of the head is unrealistic and somewhat disturbing.

Furthermore, the most problematic situation is one in which there is little or no wind, and therefore little or no decoy movement. This is a situation where the artificial drone of a mechanical/electrical device is most disturbing. This is also a situation where the present is most useful.

With eyes on the sides of their head, waterfowl lack binocular vision. They compensate by moving their heads rapidly from side to side, continuously getting images from both eyes. In a calm setting of ducks sitting on the water, these rapid head movements are surprisingly visible. The primary object of this invention is to provide beneficial decoy movement for these light or no wind situations, with limited noise and limited power consumption. The desired movement simulates the frequent and rapid side to side head movement that is typical of live ducks. These movements add sufficient movement to be noticeable, but not overpowering like a loud, rapidly spinning mechanical decoy wing. To be realistic these movements must be rotational—not merely "bobbing" of a pivoting head—and should at least sometimes occur with rapid rotational speed.

SUMMARY OF THE INVENTION

The present invention is a decoy comprising a body portion, a head that rotates on a vertical axis relative to the body portion, a rotation actuator, and a power source for powering the rotation actuator. The rotation actuator drives the rotation of the head through an arc that, in at least one direction of rotation, is sufficiently rapid to provide attention-attracting movement. The rotation is both clockwise and counterclockwise, ideally alternating between clockwise and counterclockwise, but also effective with repeated clockwise or counterclockwise movements followed by repeated movements in the opposite direction. Ideally the arc of rotation of the head in each direction is less than 360 degrees, so that the head does not make full rotations about its axis.

DETAILED DESCRIPTION OF THE INVENTION

Figure 1:
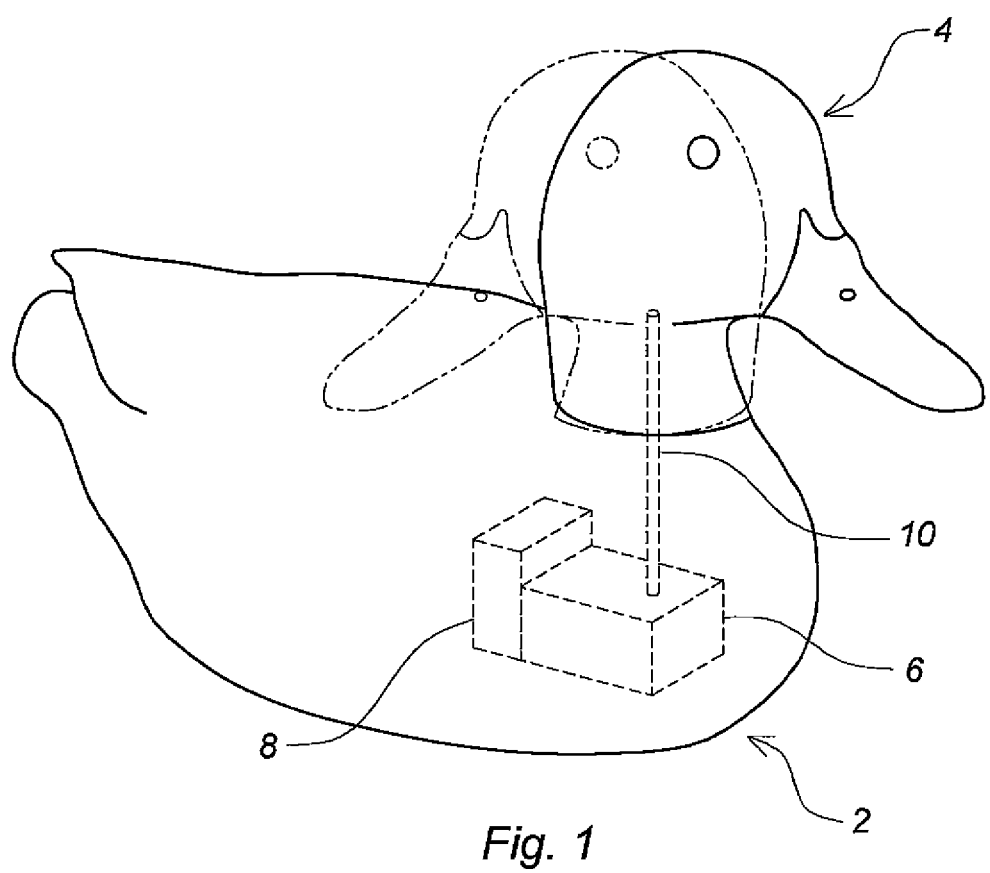
FIG. 1 shows the key elements of the present invention.

Referring to FIG. 1, the decoy of the present invention includes a body portion 2, a head 4 that rotates on a vertical axis relative to the body portion, a rotation actuator 6, and a power source 8 for powering the rotation actuator 6. The head 4 preferably rotates through an arc of rotation of less than 360 degrees (in other words, it does not fully spin around its vertical axis). Ideally the arc of alternating head rotation would be between 90 degrees (45 degrees in each direction from forward-facing) and 180 degrees (90 degrees in each direction from forward facing). In these configurations the rotation actuator would prevent the head from rotating through a full rotation of more than 360 degrees. The rotation actuator drives rotation of the head in at least one direction at a suitable speed to provide attention attracting movement. The head should traverse its arc of rotation (in at least one direction) in less than about 2 seconds and the rotation speed in at least one direction would ideally be less than about 1 second for 90 degrees of movement, or even more ideally less than about ½ second. Ideally the decoy head rotates about an axis that is substantially vertical relative to the body of the decoy. As shown in FIG. 1, shaft 10 is driven by rotation actuator 6 and provides the axis for rotation of the head 4 relative to the decoy body 2. Other routine elements necessary for the proper operation of this invention, such as wiring, on-off switches (which may be remotely operable via an RF link), attachment structure, cushioning, etc. are not shown in FIG. 1 but would be clear to one skilled in the art.

Rapid movement of the head in at least one direction is very important. This rapid head movement, while subtle compared to the vigorous spinning or flapping movement of prior art decoys, has the unexpected result of making the decoy particularly noticeable to live birds, especially in light wind conditions. The conventional view with respect to head movement, however, was as stated in Bonetti, describing the benefit of a "slow turning of the head" of the decoy. This slow turning approach would not be suitable for the present invention.

Figure 2:
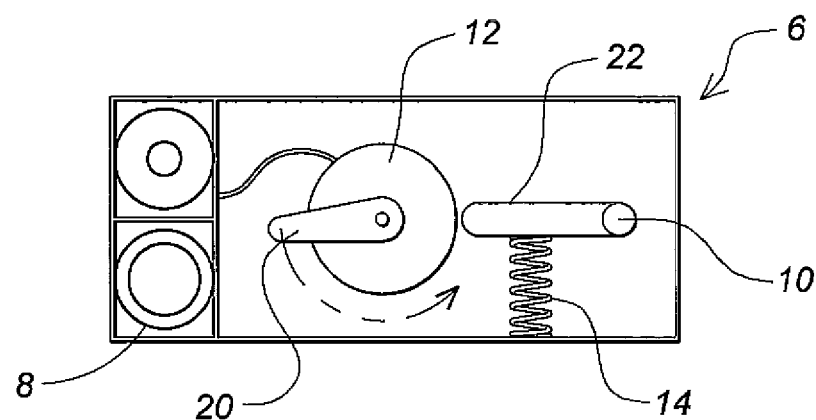
FIG. 2 shows a top view of a preferred embodiment of the rotation actuator of the present invention.

A key element of the present invention is a rotation actuator that rotates the head of the decoy in a side to side manner suitable for the objectives described herein. In one configuration, the rotation in one direction occurs at a slower rate than the rotation in the other direction. In this configuration, such as shown in FIG. 2, the rotation in the slower direction could also load a biasing means that subsequently rapidly rotates the head in the other direction. For example, in FIG. 2 the rotation actuator comprises an electric motor with a suitable gearbox 12 that rotates cam 20 which contacts shaft arm 22 which in turn rotates shaft 10. This rotation of shaft 10 rotates the decoy head 4 more slowly in a clockwise direction, and in doing so loads a biasing means (in this case an elastic member such as a spring) 14 until it reaches a point that cam 20 disengages shaft arm 22 and allows the head to rapidly rotate in the opposite direction under the force applied by the biasing means. In an embodiment like that shown in FIG. 2, the head would typically rotate in one direction over a time of one second or more, then rotate in the opposite direction very rapidly—ideally in less than one second and even more preferably in less than ½ second.

A wide range of rotation actuators are available to one skilled in the art as long as they provide a suitable speed of rotation, ideally with limited power consumption. For example, in another configuration the rotation actuator could provide the rotation in one direction is by means of an electromagnet activated by a timer. When activated, the magnet would attract a corresponding metallic portion of the rotation actuator and cause head rotation in one direction. After an activation duration, the magnet would release and the head would rapidly rotate in the other direction by virtue of a biasing force. Or the rotation actuator could be a geared step motor with suitable circuitry and programming to cause the decoy head movement meeting the requirements of this invention. In this or other configurations, the frequency of rotation and the speed of rotation may be preset, randomly generated, or user-defined. The user defined approach is beneficial in that it would allow adjustment to meet desired movement levels based on wind and water conditions and the preference of the user. Circuitry for any of these options is well known to one skilled in the art. Other biasing elastic members could be made of rubber, a suitable polymer, or a similar material, or the biasing force could be provided by a weight moving against gravity, or other means known by one skilled in the art.

Another configuration uses two alternately energized electromagnets (and no biasing means) within the rotation actuator. Another configuration uses a permanent magnet on a rotating disc or other structure that moves between a position adjacent to a metallic portion of the rotation actuator, hence attracting it, and a position away from the decoy head structure, where no attraction occurs (or any activation force is insufficient to move the head against a biasing force) and the head rotates back the other direction as a result of a biasing force. Other mechanical configurations may be used to move the magnet between the position of attraction to the decoy head structure and the position of no attraction.

All of the magnetic or electromechanical systems described above provide the advantages of rapid movement with limited noise and power consumption. Appropriate cushioning can be used to further reduce any noise generated in the operation of the decoy. In addition to the approaches described above, other electrical or mechanical designs would be readily available to one skilled in the art to provide the type of rapid head rotation movement functionality that is the key element of this invention. The needed power supply for any of these electrical configurations should be lightweight and easily recharged or replaced. Ideally the decoy would be powered by 1 or 2 AA or AAA batteries. A mechanical (wind up) approach could also be used to power the rotation actuator. In all cases the rotation actuator is actively powered—its rotation is not merely the result of the movement of the decoy in the wind or on the water.

Figure 3:
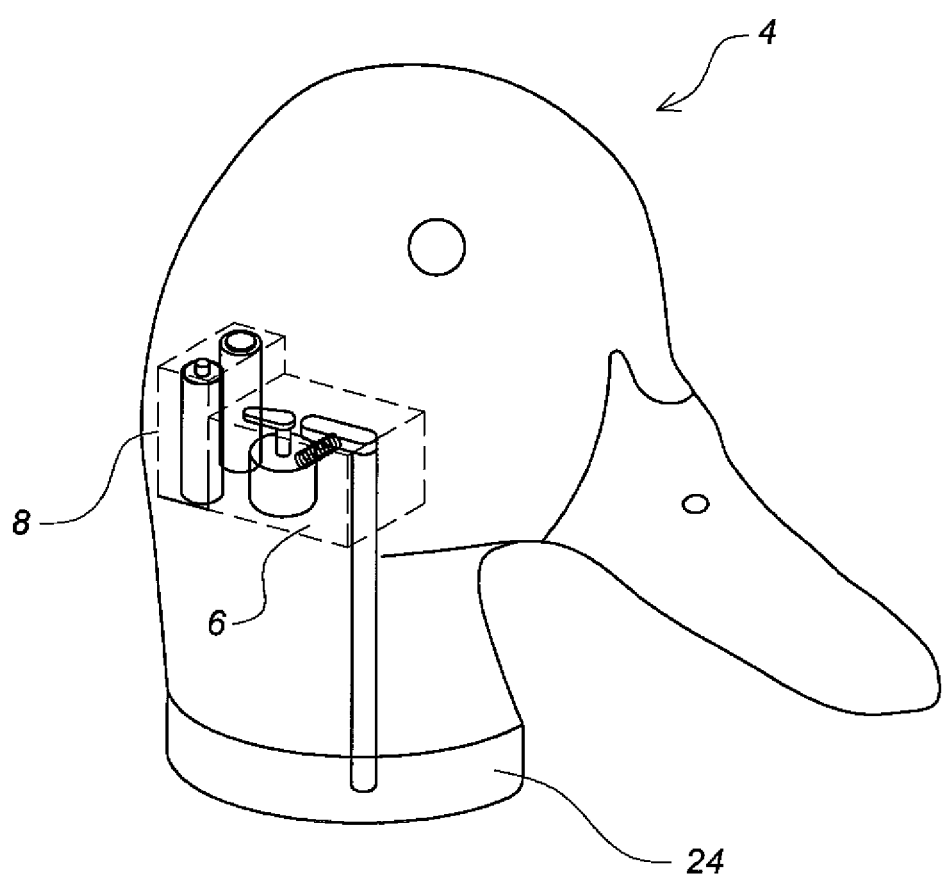
FIG. 3 shows an embodiment of the present invention in which the rotation actuator and power supply are located in a void space in the head of the decoy.

In a preferred embodiment both the power supply and the rotation actuator are located within a void space in the head of the decoy that could be easily removed from the body portion of the decoy, and then reattached. FIG. 3 shows the elements of this embodiment. The base 24 is rigidly but removably attached to the body portion of the decoy, and shaft 10 connects to the base providing the axis for rotation of the rotating portion of the decoy head 4 relative to the base 24. The rotation actuator 6 and the power supply 8 are located within a void space in the head of the decoy. The head could be easily removed for storage, maintenance, or battery replacement or charging. An advantage of this configuration is that no opening is needed into the body of the decoy, thereby reducing the risk of leaks or other water intrusion. The base 24 would attach to the body of the decoy by means of a locking tab molded into either the base 24 or the head of the decoy. The configuration of such a tab would be well known to one skilled in the art. Of course, the rotation actuator and power supply could also be located in a void space in the body of the decoy as shown in FIG. 1. The power supply should be located so that it is easily accessible for changing batteries or otherwise recharging or replacing the power supply. A solar powered charger could be easily incorporated in the present invention with a power supply either in the head or body of the decoy. A solar cell could also charge a capacitor as the power source which would periodically drive the rotation actuator.

I claim:

1. A decoy in the shape of an animal comprising a body portion, a head that rotates on a substantially vertical axis relative to the body portion, a rotation actuator for driving rotation of the head, and a power source for powering the rotation actuator, wherein said head rotates in clockwise and counterclockwise directions in alternating intervals of more rapid rotation and less rapid rotation, and said head rotates in said directions with each interval of more rapid rotation being in the direction opposite the direction of immediately the preceding interval of less rapid rotation.

2. The decoy in claim 1 wherein the power source is a battery.

3. The decoy in claim 1 with the body portion having a void space with the rotation actuator and the power source located within the void space in the body portion of the decoy.

4. The decoy in claim 1 wherein a biasing force in the rotation actuator drives the rotation of the decoy head in one direction.

5. The decoy in claim 4 wherein said biasing force is provided by an elastic member.

6. The decoy in claim 1 with the head having a void space and the rotation actuator and the power source located within said void space in the head of the decoy.

7. The decoy in claim 6 wherein a biasing force in the rotation actuator drives the rotation of the decoy head in one direction.

8. The decoy in claim 7 wherein said biasing force is provided by an elastic member.

9. The decoy in claim 6 wherein the power source is a battery.

10. The decoy in claim 6 wherein the head is part of a head assembly that is removable from the body portion of the decoy.

* * * * *